(12) United States Patent
Risius

(10) Patent No.: US 12,414,505 B2
(45) Date of Patent: Sep. 16, 2025

(54) HARVESTING SYSTEM FOR ROW-BY-ROW CONTROL OF A HARVESTER

(71) Applicant: Ag Leader Technology, Ames, IA (US)

(72) Inventor: Nathan Risius, Ames, IA (US)

(73) Assignee: Ag Leader Technology, Ames, IA (US)

( * ) Notice: Subject to any disclaimer, the term of this patent is extended or adjusted under 35 U.S.C. 154(b) by 680 days.

(21) Appl. No.: 17/468,535

(22) Filed: Sep. 7, 2021

(65) Prior Publication Data

US 2022/0071093 A1  Mar. 10, 2022

Related U.S. Application Data

(60) Provisional application No. 63/074,737, filed on Sep. 4, 2020.

(51) Int. Cl.
*A01D 45/02* (2006.01)
*A01D 41/127* (2006.01)
*F16H 61/421* (2010.01)

(52) U.S. Cl.
CPC ....... *A01D 45/023* (2013.01); *A01D 41/1272* (2013.01); *A01D 41/1274* (2013.01); *F16H 61/421* (2013.01)

(58) Field of Classification Search
CPC .............. A01D 45/023; A01D 41/1272; A01D 41/1274; A01D 45/021; F16H 61/421
See application file for complete search history.

(56) References Cited

U.S. PATENT DOCUMENTS

| | | | |
|---|---|---|---|
| 2,419,061 A | 4/1947 | Emery | |
| 2,813,709 A | 11/1957 | Hyman | |
| 3,038,544 A | 6/1962 | Richey et al. | |
| 3,178,873 A | 4/1965 | Meyer | |
| 3,246,701 A | 4/1966 | Horst | |
| 3,271,940 A * | 9/1966 | Ashton | A01D 41/141 56/119 |
| 3,616,690 A | 11/1971 | Harden | |
| 3,780,817 A | 12/1973 | Videon | |
| 3,853,000 A | 12/1974 | Barnett | |

(Continued)

FOREIGN PATENT DOCUMENTS

| | | |
|---|---|---|
| AU | 2020201559 A1 | 4/2020 |
| BE | 1023764 B1 | 7/2017 |

(Continued)

OTHER PUBLICATIONS

Baweja, Harjatin & Parhar, Tanvir & Mirbod, Omeed & Nuske, Stephen. (2018). StalkNet: A Deep Learning Pipeline for High-Throughput Measurement of Plant Stalk Count and Stalk Width.

(Continued)

*Primary Examiner* — Arpad Fabian-Kovacs
(74) *Attorney, Agent, or Firm* — DENTONS DAVIS BROWN PC; Matthew Warner-Blankenship

(57) ABSTRACT

An electrically driven corn head and/or a corn head retrofitted with individual electric motor assemblies on each corn head. The corn head configured for row-by-row control of harvesting operations. The corn head and associated systems count and estimate size of stalks and ears. Further the system is configured to measure yield.

16 Claims, 13 Drawing Sheets

(56) References Cited

U.S. PATENT DOCUMENTS

| | | |
|---|---|---|
| T934,002 I4 | 5/1975 | Trail |
| 3,972,381 A | 8/1976 | Gail |
| 3,992,933 A | 11/1976 | Randolph |
| 4,121,049 A | 10/1978 | Roeber |
| 4,126,984 A | 11/1978 | Gail |
| 4,166,349 A | 9/1979 | Coenenberg et al. |
| 4,197,690 A | 4/1980 | Eistert |
| 4,295,323 A | 10/1981 | Maier et al. |
| 4,362,218 A | 12/1982 | Shoberg |
| 4,418,521 A | 12/1983 | Orlando |
| 4,423,640 A | 1/1984 | Jetter |
| 4,505,094 A | 3/1985 | Demorest |
| 4,528,804 A | 7/1985 | Williams |
| 4,751,849 A | 6/1988 | Paros |
| 4,883,964 A | 11/1989 | Bohman |
| 4,896,491 A * | 1/1990 | Warnsholz ........... A01D 46/085 56/28 |
| 4,918,441 A | 4/1990 | Bohman |
| 4,967,362 A | 10/1990 | Schutten et al. |
| 5,044,210 A | 9/1991 | Kuhn et al. |
| 5,216,795 A | 6/1993 | Hansson |
| 5,264,709 A | 11/1993 | Kamimura |
| 5,343,761 A | 9/1994 | Myers |
| 5,369,603 A | 11/1994 | Myers |
| 5,463,854 A | 11/1995 | Chmielewski, Jr |
| 5,480,354 A | 1/1996 | Sadjadi |
| 5,568,405 A | 10/1996 | Easton et al. |
| 5,598,794 A | 2/1997 | Harms et al. |
| 5,680,750 A | 10/1997 | Stefl |
| 5,751,576 A | 5/1998 | Monson |
| 5,790,428 A | 8/1998 | Easton et al. |
| 5,847,290 A | 12/1998 | Kim |
| 5,878,561 A | 3/1999 | Gunn |
| 5,921,070 A * | 7/1999 | Chamberlain ....... A01D 45/021 56/106 |
| 5,927,054 A * | 7/1999 | Chamberlain ....... A01D 45/021 56/16.2 |
| 5,991,694 A | 11/1999 | Gudat et al. |
| 6,041,583 A | 3/2000 | Goering |
| 6,073,427 A | 6/2000 | Nichols |
| 6,085,846 A | 7/2000 | Buchl et al. |
| 6,119,442 A | 9/2000 | Hale |
| 6,202,395 B1 | 3/2001 | Gramm |
| 6,216,795 B1 | 4/2001 | Buchl |
| 6,272,819 B1 | 8/2001 | Wendte |
| 6,431,981 B1 | 8/2002 | Shinners |
| 6,530,197 B1 | 3/2003 | Christensen |
| 6,584,390 B2 | 6/2003 | Beck |
| 6,615,570 B2 | 9/2003 | Beck |
| 6,668,223 B2 | 12/2003 | Blackmore et al. |
| 6,774,320 B2 | 8/2004 | Simons |
| 6,983,582 B1 | 1/2006 | Muckler |
| 7,354,341 B1 | 4/2008 | Smith |
| 7,357,036 B2 | 4/2008 | Steprath |
| 7,401,506 B2 | 7/2008 | Kunow |
| 7,401,528 B2 | 7/2008 | Deppermann et al. |
| 7,647,753 B2 | 1/2010 | Schlipf |
| 7,716,905 B2 | 5/2010 | Wilcox et al. |
| 7,739,861 B2 * | 6/2010 | Mackin ................ A01D 45/021 56/10.2 G |
| 7,790,991 B2 | 9/2010 | Verhaeghe |
| 7,916,898 B2 | 3/2011 | Anderson |
| 8,006,472 B1 * | 8/2011 | Schreiner ............... A01D 46/16 56/49 |
| 8,010,261 B2 | 8/2011 | Brubaker |
| 8,196,380 B2 | 6/2012 | Carboni |
| 8,201,388 B1 | 6/2012 | Vandeven |
| 8,215,191 B2 | 7/2012 | Tragesser et al. |
| 8,220,235 B2 | 7/2012 | Kowalchuk |
| 8,224,534 B2 | 7/2012 | Kowalchuk |
| 8,418,636 B2 | 4/2013 | Liu et al. |
| 8,820,039 B2 | 9/2014 | Werning |
| 8,987,615 B2 | 3/2015 | Khatavkar |
| 9,030,549 B2 | 5/2015 | Redden |
| 9,064,173 B2 | 6/2015 | Redden |
| 9,066,463 B2 | 6/2015 | Lange |
| 9,213,905 B2 | 12/2015 | Lange |
| 9,232,693 B2 | 1/2016 | Hendrickson et al. |
| 9,282,693 B2 | 3/2016 | Anderson |
| 9,310,329 B2 | 4/2016 | Acheson et al. |
| 9,320,196 B2 | 4/2016 | Dybro et al. |
| 9,322,629 B2 | 4/2016 | Sauder et al. |
| 9,360,383 B2 | 6/2016 | Coleman |
| 9,372,109 B2 | 6/2016 | Acheson et al. |
| 9,410,840 B2 | 8/2016 | Acheson et al. |
| 9,423,249 B2 | 8/2016 | Deppermann et al. |
| 9,485,914 B2 | 11/2016 | Schleicher et al. |
| 9,565,802 B2 | 2/2017 | Schleicher |
| 9,578,804 B2 * | 2/2017 | Gessel ................ A01D 45/021 |
| 9,578,808 B2 | 2/2017 | Dybro |
| 9,609,806 B2 | 4/2017 | Schlipf |
| 9,645,006 B2 | 5/2017 | Phelan |
| 9,658,201 B2 | 5/2017 | Redden et al. |
| 9,668,412 B2 | 6/2017 | Ritter |
| 9,668,420 B2 | 6/2017 | Anderson |
| 9,693,496 B2 | 7/2017 | Tevs et al. |
| 9,693,503 B2 | 7/2017 | Dybro et al. |
| 9,696,162 B2 | 7/2017 | Anderson |
| 9,717,171 B2 | 8/2017 | Redden et al. |
| 9,756,771 B2 | 9/2017 | Redden |
| 9,804,097 B1 | 10/2017 | Tang et al. |
| 9,826,673 B1 | 11/2017 | Ray |
| 9,832,928 B2 | 12/2017 | Dybro et al. |
| 9,867,334 B2 | 1/2018 | Jongmans et al. |
| 9,867,335 B1 | 1/2018 | Obbink et al. |
| 9,894,835 B2 | 2/2018 | Sauder et al. |
| 9,921,064 B2 | 3/2018 | Schleicher |
| 9,927,242 B2 | 3/2018 | Schleicher |
| 9,936,631 B1 | 4/2018 | Hubner et al. |
| 9,936,637 B2 | 4/2018 | Anderson et al. |
| 9,972,058 B2 | 5/2018 | Romier |
| 9,974,233 B2 | 5/2018 | Jeda et al. |
| 10,034,424 B2 | 7/2018 | Anderson |
| 10,039,228 B2 | 8/2018 | Walker |
| 10,039,231 B2 | 8/2018 | Anderson et al. |
| 10,130,035 B2 | 11/2018 | Crow |
| 10,178,828 B2 | 1/2019 | Hendrickson et al. |
| 10,188,037 B2 | 1/2019 | Sauder |
| 10,255,670 B1 | 4/2019 | Wu |
| 10,295,703 B2 | 5/2019 | Dybro |
| 10,299,422 B2 | 5/2019 | Schleicher |
| 10,473,592 B2 | 11/2019 | Kramer et al. |
| 10,537,060 B2 | 1/2020 | Sauder et al. |
| 10,582,662 B2 | 3/2020 | Ricketts |
| 10,713,768 B2 | 7/2020 | Berghoefer |
| 10,820,508 B2 | 11/2020 | Dix et al. |
| 10,859,479 B2 | 12/2020 | Brune et al. |
| 11,048,938 B2 | 6/2021 | Hundley et al. |
| 11,064,653 B2 | 7/2021 | Zielke |
| 11,079,725 B2 | 8/2021 | Palla |
| 11,129,333 B2 | 9/2021 | Derscheid |
| 11,234,366 B2 | 2/2022 | Darr |
| 11,275,941 B2 | 3/2022 | Papanikolopoulos et al. |
| 11,297,768 B2 | 4/2022 | Schildroth |
| 11,432,464 B2 | 9/2022 | Hayashi |
| 11,678,607 B2 | 6/2023 | Zielke |
| 11,704,810 B2 | 7/2023 | Sneyders |
| 11,758,845 B2 | 9/2023 | Zielke |
| 11,758,848 B2 * | 9/2023 | Eichhorn ............. A01D 41/127 73/865.8 |
| 2002/0173893 A1 | 11/2002 | Blackmore et al. |
| 2004/0050138 A1 | 3/2004 | Beck |
| 2004/0194442 A1 | 10/2004 | Maertens |
| 2007/0044445 A1 | 3/2007 | Spicer et al. |
| 2007/0228707 A1 | 10/2007 | Curtis |
| 2007/0289281 A1 * | 12/2007 | Altepost ............. A01D 43/082 56/64 |
| 2008/0046154 A1 * | 2/2008 | Bares ................... A01D 46/085 701/50 |
| 2009/0192734 A1 | 7/2009 | Mackin |
| 2010/0089178 A1 | 4/2010 | Tragresser |
| 2011/0173942 A1 | 7/2011 | Kowalchuk |
| 2012/0029757 A1 | 2/2012 | Kowalchuk |

(56) References Cited

U.S. PATENT DOCUMENTS

| | | | |
|---|---|---|---|
| 2012/0042618 A1* | 2/2012 | Lohrentz | A01D 45/021 56/60 |
| 2012/0042619 A1 | 2/2012 | Lohrentz et al. | |
| 2012/0055131 A1* | 3/2012 | Zegota | A01D 45/021 56/60 |
| 2012/0055133 A1* | 3/2012 | Lohrentz | A01D 45/021 56/94 |
| 2012/0204528 A1 | 8/2012 | Regier | |
| 2012/0253611 A1 | 10/2012 | Zielke | |
| 2013/0125800 A1 | 5/2013 | Landphair et al. | |
| 2013/0152535 A1* | 6/2013 | Roberge | A01D 34/78 56/10.2 R |
| 2014/0020354 A1* | 1/2014 | Tilly | A01D 45/021 56/103 |
| 2014/0116077 A1 | 5/2014 | Pierce | |
| 2014/0230391 A1 | 8/2014 | Hendrickson | |
| 2014/0230580 A1 | 8/2014 | Dybro | |
| 2014/0236381 A1 | 8/2014 | Anderson | |
| 2014/0311113 A1 | 10/2014 | Bonefas | |
| 2014/0331631 A1 | 11/2014 | Sauder | |
| 2015/0082760 A1 | 3/2015 | Zentner | |
| 2015/0082780 A1 | 3/2015 | Dueckinghaus | |
| 2015/0257337 A1* | 9/2015 | Schrattenecker | A01D 45/028 56/60 |
| 2015/0289438 A1 | 10/2015 | Sauder et al. | |
| 2015/0293029 A1 | 10/2015 | Acheson | |
| 2015/0293068 A1 | 10/2015 | Acheson et al. | |
| 2015/0302305 A1 | 10/2015 | Rupp | |
| 2015/0319929 A1 | 11/2015 | Hendrickson | |
| 2015/0327440 A1 | 11/2015 | Dybro | |
| 2015/0334920 A1 | 11/2015 | Schleicher | |
| 2016/0037709 A1 | 2/2016 | Sauder et al. | |
| 2016/0041803 A1 | 2/2016 | Markov | |
| 2016/0084813 A1 | 3/2016 | Anderson | |
| 2016/0084987 A1 | 3/2016 | Dybro | |
| 2016/0120129 A1 | 5/2016 | Verhaeghe | |
| 2016/0174465 A1 | 6/2016 | Kohls | |
| 2016/0338267 A1 | 11/2016 | Anderson et al. | |
| 2016/0345485 A1 | 12/2016 | Acheson | |
| 2017/0061211 A1 | 3/2017 | Hundley et al. | |
| 2017/0089742 A1* | 3/2017 | Bruns | A01D 41/1273 |
| 2017/0199528 A1 | 7/2017 | Detweiler | |
| 2017/0228118 A1 | 8/2017 | Sugumarn et al. | |
| 2017/0251600 A1 | 9/2017 | Anderson | |
| 2017/0332551 A1 | 11/2017 | Todd | |
| 2017/0339827 A1 | 11/2017 | Anderson | |
| 2018/0017965 A1 | 1/2018 | Kosa | |
| 2018/0084725 A1* | 3/2018 | Ostermeier | A01D 46/14 |
| 2018/0092303 A1* | 4/2018 | Goering | A01D 69/025 |
| 2018/0164471 A1* | 6/2018 | Dybro | G01B 21/22 |
| 2018/0199509 A1 | 7/2018 | Ricketts | |
| 2018/0228086 A1 | 8/2018 | Cook | |
| 2018/0338423 A1 | 11/2018 | Lucca | |
| 2018/0368321 A1* | 12/2018 | Noonan | A01D 46/085 |
| 2018/0373259 A1 | 12/2018 | Aberle | |
| 2019/0000007 A1 | 1/2019 | Schleicher | |
| 2019/0059223 A1 | 2/2019 | Seiders | |
| 2019/0110394 A1 | 4/2019 | VanNahmen | |
| 2019/0174667 A1 | 6/2019 | Gresch | |
| 2019/0195762 A1 | 6/2019 | Brune | |
| 2019/0261561 A1 | 8/2019 | Heitmann | |
| 2020/0000034 A1 | 1/2020 | Schlipf | |
| 2020/0008351 A1 | 1/2020 | Zielke | |
| 2020/0053961 A1 | 2/2020 | Dix | |
| 2020/0068803 A1 | 3/2020 | Sauder et al. | |
| 2020/0326674 A1 | 10/2020 | Palla | |
| 2020/0394580 A1 | 12/2020 | Bull | |
| 2021/0051849 A1 | 2/2021 | Asebedo | |
| 2021/0059114 A1 | 3/2021 | Eichhorn | |
| 2021/0132618 A1 | 5/2021 | Van Roekel | |
| 2021/0168991 A1 | 6/2021 | Dix | |
| 2021/0195824 A1 | 7/2021 | Van Roekel | |
| 2021/0315160 A1 | 10/2021 | Zielke | |
| 2021/0318118 A1 | 10/2021 | Eichhorn | |
| 2021/0321567 A1 | 10/2021 | Sidon | |
| 2021/0329837 A1 | 10/2021 | Schnaider | |
| 2021/0329838 A1 | 10/2021 | Zielke | |
| 2021/0352847 A1 | 11/2021 | Hunt | |
| 2022/0000024 A1 | 1/2022 | Zielke | |
| 2022/0071093 A1 | 3/2022 | Risius | |
| 2022/0078975 A1 | 3/2022 | Slichter | |
| 2022/0132737 A1 | 5/2022 | Anderson | |
| 2022/0225569 A1* | 7/2022 | Zielke | A01D 45/021 |
| 2022/0232759 A1 | 7/2022 | Sauder | |
| 2022/0317688 A1 | 10/2022 | Li | |
| 2022/0386527 A1 | 12/2022 | Schleicher | |
| 2023/0000015 A1 | 1/2023 | Herrmann | |
| 2023/0073551 A1* | 3/2023 | Holoubek | A01B 79/005 |
| 2023/0139169 A1 | 5/2023 | Cleodolphi | |
| 2023/0189690 A1 | 6/2023 | Friedlein | |
| 2023/0229163 A1 | 7/2023 | Rust | |
| 2023/0240185 A1 | 8/2023 | Zielke | |
| 2023/0243693 A1 | 8/2023 | McClelland | |
| 2023/0292664 A1 | 9/2023 | Zielke | |
| 2023/0389473 A1* | 12/2023 | Reed | A01D 45/023 |
| 2023/0401703 A1 | 12/2023 | Friedlein | |
| 2024/0023482 A1 | 1/2024 | Zielke | |
| 2024/0065156 A1 | 2/2024 | Woodcock | |
| 2024/0081171 A1 | 3/2024 | Schwartz | |
| 2024/0090379 A1 | 3/2024 | Eichhorn | |
| 2024/0373785 A1 | 11/2024 | Risius | |
| 2024/0389494 A1 | 11/2024 | Vorobiev | |
| 2025/0185540 A1 | 6/2025 | Eichhorn | |
| 2025/0194459 A1 | 6/2025 | Roe | |

FOREIGN PATENT DOCUMENTS

| | | | | |
|---|---|---|---|---|
| BR | 102017018379 A2 | 5/2018 | | |
| CA | 2313376 | 7/2000 | | |
| DE | 1928065 A1 | 5/1970 | | |
| DE | 112014000906 T5 | 11/2015 | | |
| EP | 2191439 B1 | 2/2009 | | |
| EP | 2047738 A2 * | 4/2009 | | A01D 45/025 |
| EP | 3146831 B1 | 3/2017 | | |
| EP | 2944179 B1 | 11/2017 | | |
| EP | 3245859 A1 * | 11/2017 | | A01D 41/06 |
| EP | 3095313 B1 | 5/2019 | | |
| EP | 3972381 A1 | 3/2022 | | |
| JP | 6216795 B2 | 10/2017 | | |
| WO | 2013078328 A2 | 5/2013 | | |

OTHER PUBLICATIONS

Birrell et al., "Corn Population Sensor for Precision Farming", American Society of Agricultural Engineers. Annual Meeting, 1995, vol. 95, No. 1334, Publisher: ASAE.

D. Easton, "Corn Population and Plant Spacing Variability: The Next Mapping Layer", 1996, pp. 723-727, Publisher: ASA-CSSA-SSSA, Published in: Madison, WI.

Farm Show, "Easton Goers, Inc. Space Wheel Checks Seed Placement in Field—Space Cadet", 1996, Publisher: Farm Show.

Haizhou Li, "Design and Evaluation of a Non-Intrusive Corn Population Sensor", "Trace: Tennessee Research and Creative Exchange, Doctoral Dissertations, Graduate School", Aug. 2007, Publisher: University of Tennessee, Knoxville.

Headsight, Inc., "Row Guidance for Corn", Jan. 2021, https://headsight.com/row-guidance-corn.

Hummel et al., "Sensing Corn Population—Another Variable in the Yield Equation", available as early as 2016.

John Deere SSA, "AutoTrac RowSense | Precision AG | John Deere SSA", Jan. 2021, https://www.deere.com/sub-saharan/en/technology-products/precision-ag/autotrac-rowsense/.

Jonathan P. Kelly, "By-Plant Prediction of Corn (*Zea mays* L.) Grain Yield Using Height and Stalk Diameter", 2009, Publisher: Faculty of the Graduate College of the Oklahoma State University.

Luck et al., "Sensor Ranging Technique for Determining Corn Plant Population", "Faculty Papers and Publications in Animal Science—Animal Science Department", 2008, vol. 920, Publisher: University of Nebraska - Lincoln.

(56) References Cited

OTHER PUBLICATIONS

Plattner, C. E., J. W. Hummel 1996. Corn Plant Population Sensor for Precision Agriculture. In: P.C. Robert, R.H. Rust, W.E. Larson, editors, Precision Agriculture, ASA, CSSA, SSSA, Madison, WI. p. 785-794.

Reichhardt Electronic Innovations, "Psr Sensor Guidance", Jan. 2021, www.reichhardt.com/us_products_autosteer-system_autoguidance-tac.html/.

Shrestha et al., "Automatic Corn Plant Population Measurement Using Machine Vision", "Transactions of the ASAE", 2003, pp. 559-565, vol. 46(2), Publisher: American Society of Agricultural Engineers.

Sudduth, K.A., Birrell, S.J., Krumpelman, M.J., Robert, P., Rust, R.H., & Larson, W.E. (2000). Field evaluation of a corn population sensor.

Yeyin Shi, "Corn Plant Location, Spacing and Stalk Diameter Measurements Using Optical Sensing Technologies", May 2014, Publisher: Faculty of the Graduate College of the Oklahoma State University.

Yu, H. Zheng, S. R. Kulkarni, H. V. Poor, "Outlier elimination for robust ellipse and ellipsoid fitting," in Proc. 3rd IEEE Int. Workshop Comput. Adv. Multi-Sensor Adapt. Process. (CAMSAP), Aruba, Dutch Antilles, Dec. 2009, pp. 33-36.

Drago, Row by Row, 2020, Special Report Harvest Study Reveals Most Corn Heads Leaving Yield in the Field.

Gore, L. M. 1996. Report: Stalk counter for VRT study fall of 1995. Deere & Co. Moline, IL.

Area of a circle (Mar. 10, 2022). Wikipedia. Https://web.archive.org/web/20200325064526/https://en.wikipedia.org/wiki/Area_of_acircle (year 2020).

Contributions to Wikimedia projects (Feb. 20, 2020), Numerical integration. Wikipedia. Https://web.archive.org/web/20200325094046/https://en.wikipedia.org/wiki/numerical_integration (Year: 2020).

Miller et al.(Nov. 16, 2016). The Plant Journal. https://onlinelibrary.wiley.com/doi/pdf/10.1111/tpj.13320.

Of GIS Ag Maps (here in as GIS), "Yield Monitor Data Post-Calibration (Linear and Non-Linear) Examples", Jan. 20, 2022, 8 pages + 1 SS page (9 pgs total).

\* cited by examiner

HARVESTING SYSTEM FOR ROW-BY-ROW CONTROL OF A HARVESTER

CROSS-REFERENCE TO RELATED APPLICATION(S)

This application claims the benefit under 35 U.S.C. § 119(e) to U.S. Provisional Application 63/074,737, filed Sep. 4, 2020, and entitled "Apparatus, Systems and Methods for an Electric Corn Head," which is hereby incorporated herein by reference in its entirety.

TECHNICAL FIELD

This disclosure relates to agricultural harvesters and in particular to corn heads and related harvesting systems and devices.

BACKGROUND

Various known corn heads and their row units are mechanically driven, utilizing a single drive shaft mechanism for the entire swath of the corn head. These known corn heads require a significant amount of manual operation and control, such as for engaging and disengaging the corn head, increasing and decreasing operating speed, and narrowing and widening the stripper plate gap. These manual operations lack efficiency and accuracy. Thus, there is a need in the art for improved corn heads and harvesting systems.

BRIEF SUMMARY

Described herein are various embodiments relating to devices, systems, and methods for a corn head with individually driven row units. That is, in some implementations, the corn head allows for row-by-row control of the operation of the row units. This has implications for efficiency, automation, increasing yields, and improving data collection.

In various implementations, the disclosed devices, systems, and methods are constructed and arranged to collect row-by-row data during harvest operations to create detailed and high-resolution yield and harvest data maps. In various implementations, the devices, systems, and methods can detect plugged row units in real-time or near real-time.

According to one example, the electrically driven corn head comprises a power supply and a motor driver and motor are disposed on each of the plurality of row units of the corn head. In some implementations of this example each row unit includes a controller, or alternatively the corn head includes a central controller. In a further example, the motor driver, motor, and controller create a feedback loop providing for automated control of the corn row unit.

In Example 1, a harvesting system comprising a power supply and a plurality of row units, each row unit comprising a motor driver in electrical communication with the power supply and a motor in operative communication with the motor driver. The system also comprising a controller in electrical communication with the power supply and the motor driver, wherein the controller records motor current data during harvesting operations.

Example 2 relates to the system of Example 1, wherein the motor current data is analyzed to detect and measure harvested crops.

Example 3 relates to the system of Example 2, further comprising a display in communication with the controller and a yield monitor in communication with the display, wherein the display is configured to map yields row-by-row.

Example 4 relates to the system of Example 3, wherein the display is configured to determine stalk sizes from the motor current data.

Example 5 relates to the system of Example 1, wherein the controller is constructed and arranged to individually control each of the plurality of row units.

Example 6 relates to the system of Example 5, wherein the controller is configured to dynamically adjust power to each of the plurality of row units.

Example 7 relates to the system of Example 1, wherein the controller is configured to detect a plugged row unit from the motor current data.

Example 8 relates to the system of Example 7, wherein the controller is configured to reverse the plugged row unit when the plugged row unit is detected.

In Example 9, a harvesting system, comprising one or more row units, each row unit comprising a motor driver and a motor in communication with the motor driver, wherein the motor drives a mechanical drive system of the row unit. The system also comprising a power source in communication with each row unit, at least one controller in communication with the power source and the motor driver, and a data logger configured to measure and log current flow between the power source and the motor driver, wherein each row unit is individually controllable.

Example 10 relates to the system of Example 9, wherein current flow data is used by a display to count stalks passing through each of the row units.

Example 11 relates to the system of Example 10, wherein the system is configured to combine current flow data with yield monitor data to generate row-by-row yield data.

Example 12 relates to the system of Example 11, wherein the row-by-row yield data further comprises plant-by-plant yield data.

Example 13 relates to the system of Example 9, further comprising a controller in association with each row unit.

Example 14 relates to the system of Example 9, wherein the system is configured to dynamically adjust power to each of the one or more row units.

In Example 15, a corn head retrofit assembly, comprising an electric motor assembly, comprising a motor driver and an electric motor in communication with the motor driver. The assembly also comprising a controller in operative communication with the electric motor assembly, wherein the electric motor assembly drives a mechanical drive system of a row unit and wherein the controller allows for independent control of the mechanical drive system via the electric motor assembly.

Example 16 relates to the corn head retrofit assembly of Example 15, wherein the mechanical drive system includes stalk rolls and gathering chains.

Example 17 relates to the corn head retrofit assembly of Example 15, wherein the motor driver is in operative communication with a power supply.

Example 18 relates to the corn head retrofit assembly of Example 15, further comprising a data logger configured to log current between the motor driver and the electric motor.

Example 19 relates to the corn head retrofit assembly of Example 18, wherein the data logger is in operative communication with a display configured to detect spikes in the current indicative of stalks passing through the row unit.

Example 20 relates to the corn head retrofit assembly of Example 19, wherein the display is configured to estimate yields row-by-row from the current data.

While multiple embodiments are disclosed, still other embodiments of the disclosure will become apparent to those skilled in the art from the following detailed description, which shows and describes illustrative embodiments of the disclosed apparatus, systems, and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1A:
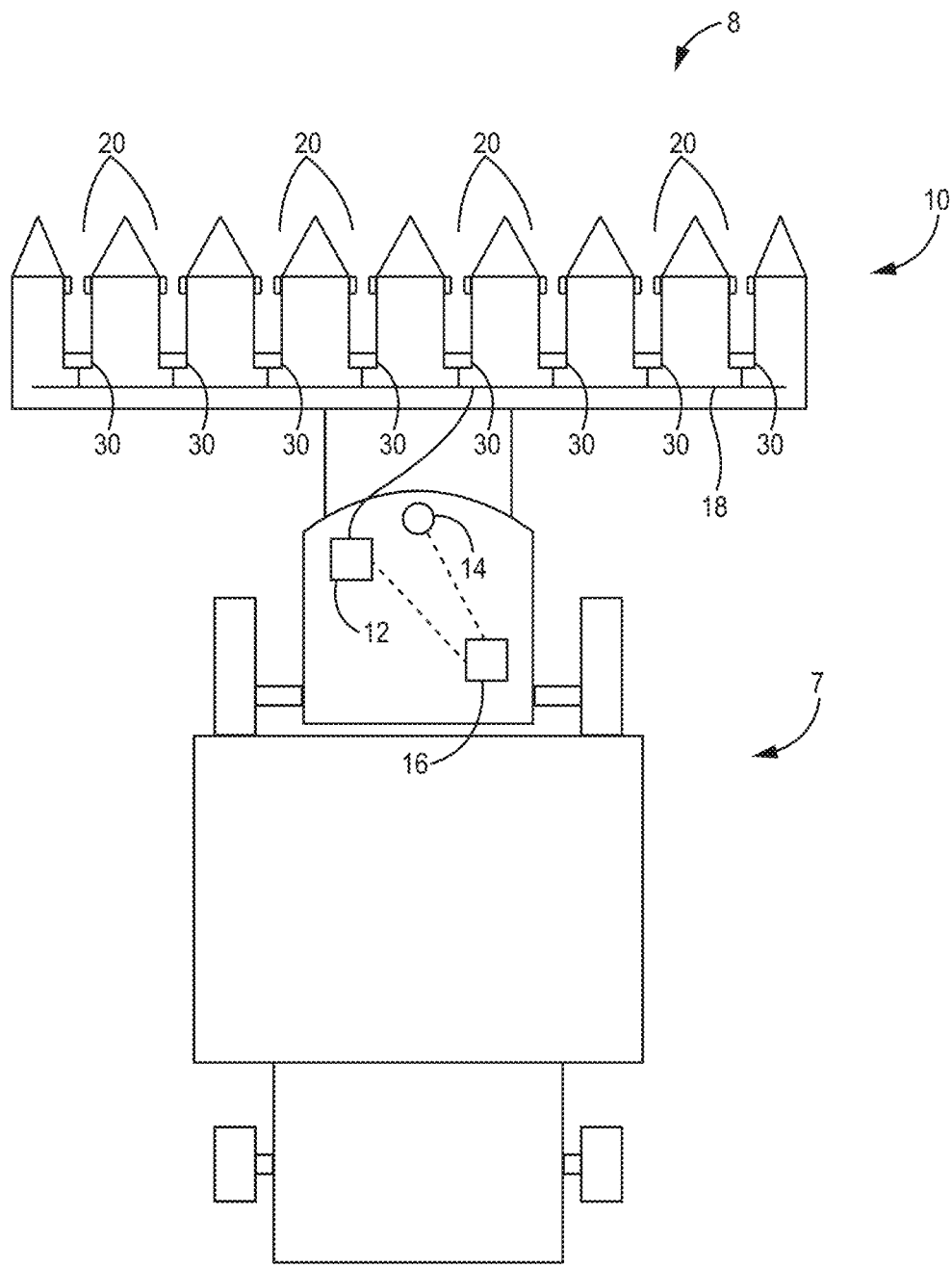
FIG. 1A is a top view of the system, according to one implementation.

Discussed herein are various devices, systems, and methods relating to a corn head for use with an agricultural vehicle, such as a combine harvester. According to certain implementations, the corn head includes a power supply, an electric motor, and a drive system for each row unit, such that each row unit can be individually operated and controlled via the monitoring, thresholding, and application of electrical power on a row-by-row basis. In certain implementations, the system described herein may be retrofitted to an existing corn head/harvester to provide for gains in efficiency and the reduction of damage. In certain implementations, the system allows for row-by-row dynamic control of the individual row units/motors. Various implementations of the system allow for generation of high-resolution yield data, such as row-by-row or plant-by-plant yield data. Certain advantages related to the use of electrical power for the row units/motor are also apparent: such systems, methods and devices allow for the use of electrical power or other alternative energy sources for use in these agricultural operations.

The automated and individualized electrical control of each row unit, discussed herein, may provide power savings and other advantages by varying the power delivered to each row unit, that is, by providing only the amount of power necessary for a particular row unit and avoiding the disadvantages associated with unnecessary power. Further, various implementations of the corn head systems and devices described herein may be used in the automation of various aspects of harvest operations, such as adjustments to row unit speed. Still further, the system disclosed and contemplated herein may eliminate the need for slip clutches and/or other power trains present in various existing corn heads.

In various implementations, the methods, devices, and systems disclosed and contemplated herein may be used in connection with a yield monitoring system to estimate and measure harvest/yield data optionally in real-time or near real-time. In various implementations, the disclosed devices, systems, and methods are configured for row-by-row, or in some implementations for plant-by-plant, collection and analysis of harvest/yield data via the monitoring of electrical signals from the row units and/or header. In certain implementations, the system may allow for the estimation of stalk and/or ear size, as well as, or in addition to counting of stalks and/or ears.

Certain of the disclosed implementations can be used in conjunction with any of the devices, systems or methods taught or otherwise disclosed in U.S. Pat. No. 10,684,305 issued Jun. 16, 2020, entitled "Apparatus, Systems and Methods for Cross Track Error Calculation From Active Sensors," U.S. Pat. No. 11,064,653, issued Jul. 20, 2021, entitled "Agricultural Systems Having Stalk Sensors and/or Data Visualization Systems and Related Devices and Methods," U.S. patent application Ser. No. 16/800,469, filed Feb. 25, 2020, entitled "Vision Based Stalk Sensors and Associated Systems and Methods," U.S. patent application Ser. No. 17/013,037, filed Sep. 4, 2020, entitled "Apparatus, Systems and Methods for Stalk Sensing," U.S. patent application Ser. No. 17/226,002 filed Apr. 8, 2021 and entitled "Apparatus, Systems and Methods for Stalk Sensing," U.S. patent application Ser. No. 16/918,300, filed Jul. 1, 2020, entitled "Apparatus, Systems, and Methods for Eliminating Cross-Track Error," U.S. patent application Ser. No. 16/921,828, filed Jul. 6, 2020, entitled "Apparatus, Systems and Methods for Automatic Steering Guidance and Visualization of Guidance Paths," U.S. patent application Ser. No. 16/939,785, filed Jul. 27, 2020, entitled "Apparatus, Systems and Methods for Automated Navigation of Agricultural Equipment," U.S. patent application Ser. No. 17/132,152, filed Dec. 23, 2020, entitled "Use of Aerial Imagery For Vehicle Path Guidance and Associated Devices, Systems, and Methods," U.S. patent application Ser. No. 17/225,586, filed Apr. 8, 2021, entitled "Devices, Systems, and Methods for Corn Headers," U.S. patent application Ser. No. 17/225,740, filed Apr. 8, 2021, entitled "Devices, Systems, and Methods for Sensing the Cross Sectional Area of Stalks," U.S. patent application Ser. No. 17/323,649, filed May 18, 2021, entitled "Assisted Steering Apparatus and Associated Systems and Methods," U.S. patent application Ser. No. 17/369,876, filed Jul. 7, 2021, entitled "Apparatus, Systems, and Methods for Grain Cart-Grain Truck Alignment and Control Using GNSS and/or Distance Sensors," U.S. patent application Ser. No. 17/381,900, filed Jul. 21, 2021, entitled "Visual Boundary Segmentations and Obstacle Mapping for Agricultural Vehicles," U.S. Patent Application 63/137,946, filed Jan. 15, 2021, entitled "Apparatus, Systems, and Methods for Row Crop Headers," U.S. Patent Application 63/176,408, filed Apr. 19, 2021, entitled "Automatic Steering Systems and Methods," and U.S. Patent Application 63/186,995, filed May 11, 2021, entitled "Calibration Adjustment for Automatic Steering Systems."

Figure 1B:
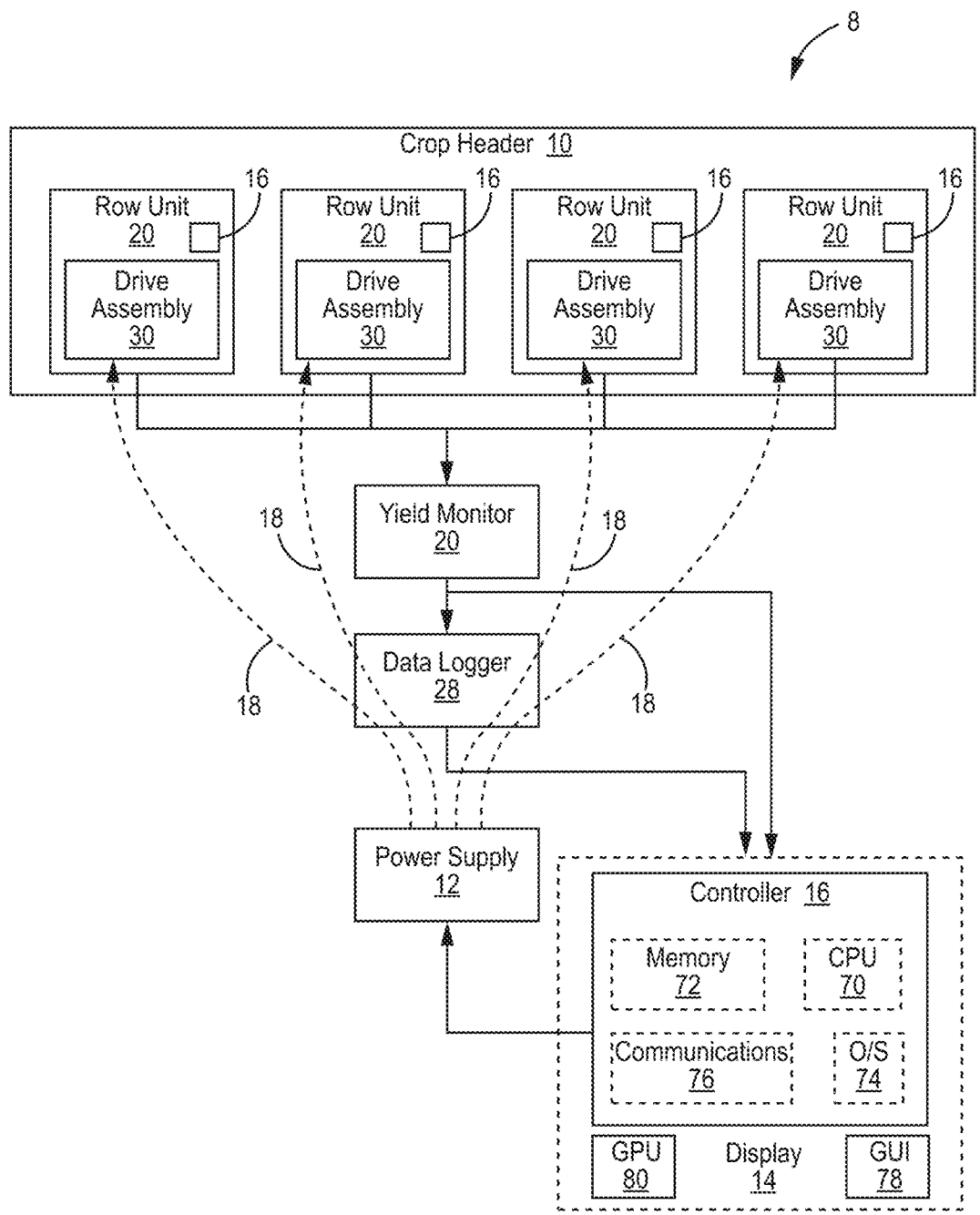
FIG. 1B is a schematic depiction of the system, according to one implementation.

Turning to the figures in greater detail, FIGS. 1A and 1B show an overview of the harvest system 8. In various implementations, the harvest system 8 includes a corn head 10 disposed on an agricultural vehicle 7, such as a combine 7. As would be appreciated the corn head 10 includes one or more row units 20. Various row unit 20 components would be appreciated, such as, but not limited to, stripper plates 22, gathering chains 24, stalk sensors 26, stalk rolls 27, and chopping blades 29 shown for example in FIGS. 2A-C. As would be understood, each of the row units 20 on a corn head 10 are typically substantially identical, while some variances are possible. As would be further understood, the various components of the row units 20 are optional and may not be necessary for the operation of the system 8.

Continuing with FIGS. 1A and 1B, in various implementations, the system 8 further includes a power supply 12 optionally disposed on the vehicle 7 or the corn head 10. In certain implementations, the power supply 12 may be a high voltage power supply 12. In one specific example, the power supply 12 may be a 24V power supply 12 capable of providing 20 amps of current. In various implementations, the power supply 12 is in communication with a power source/generator. In certain implementations, the power source is an existing system on the vehicle 7, such as but not limited to a mechanical, hydraulic, or pneumatic system located on or associated with the vehicle 7 for use in performing various other operations, as would be appreciated by those of skill in the art.

In an alternative implementation, the power supply 12 may include a high voltage battery configured to store energy and supply high voltage current to the row units 20. Someone having ordinary skill in the art would also recognize that other power supplies 12 capable of supplying sufficient voltage are possible.

Continuing with FIGS. 1A and 1B, in certain implementations, the power supply 12 is in wired or otherwise operational/electrical communication with the individual row units 20 of the corn head 10. In various implementations, the power supply 12 is connected to each of the row units 20 by a single wiring harness 18. In these and other implementations, a single power supply 12 and, optionally, wiring harness 18, provide power to all row units 20, but as will be discussed further herein, each row unit 20 is subject to individual control.

In these and other implementations, the power supply 12 is in communication with an electric motor assembly 30 on each row unit 20. In various implementations, the electric motor assembly includes various optional components including a controller 16, a motor driver 32, an electric motor 34, and a mechanical drive system 36. In certain implementations, the system includes a single controller 16 for the entire system 8. In alternative implementations, one or more controllers 16 are implemented on the system 8, for example one controller 16 per row unit 20.

Figure 2A:
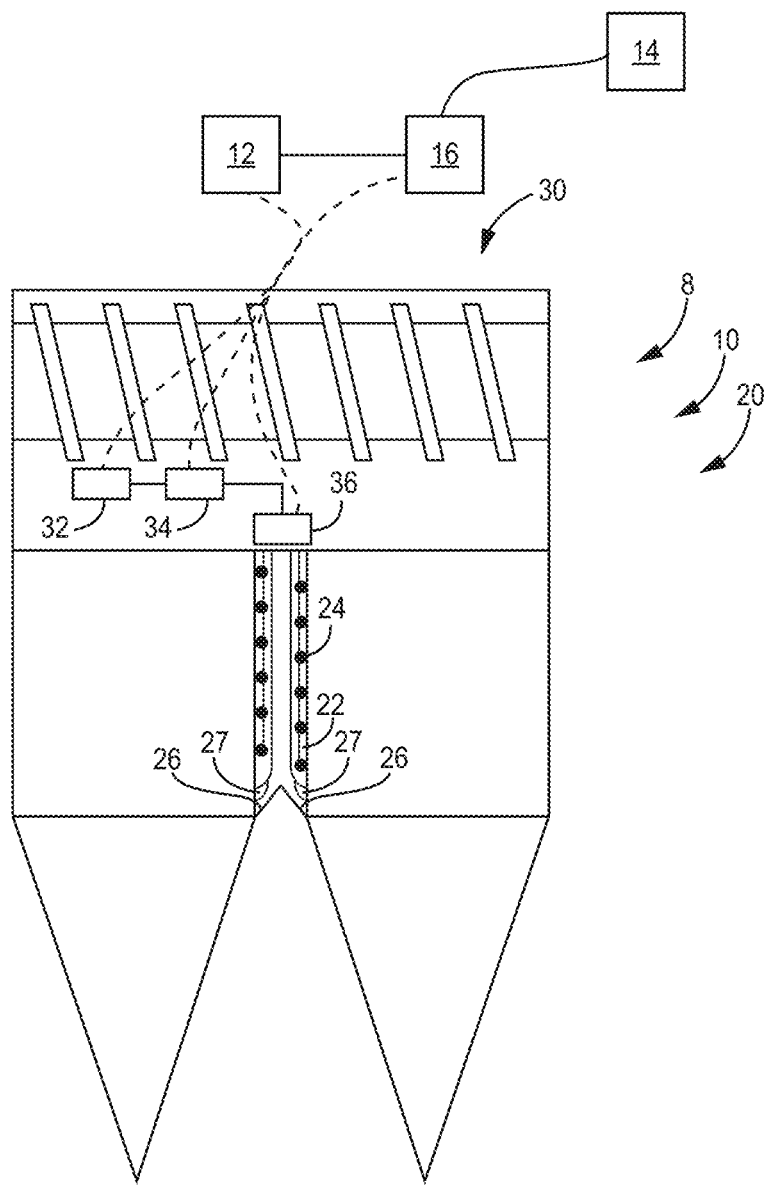
FIG. 2A is a top view of a corn head row unit, according to one implementation.
Figure 2B:
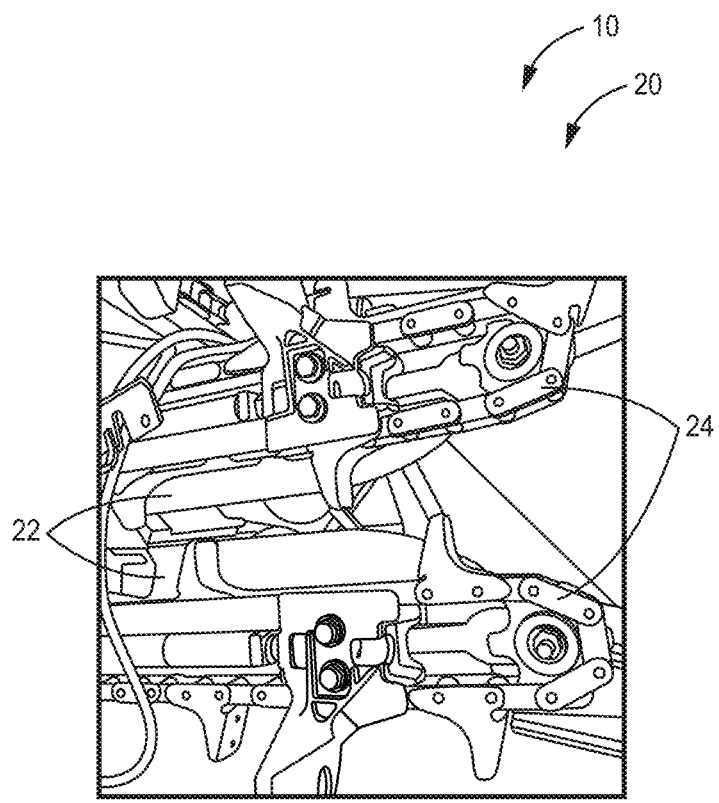
FIG. 2B is a top view of a corn head row unit, according to one implementation.
Figure 2C:
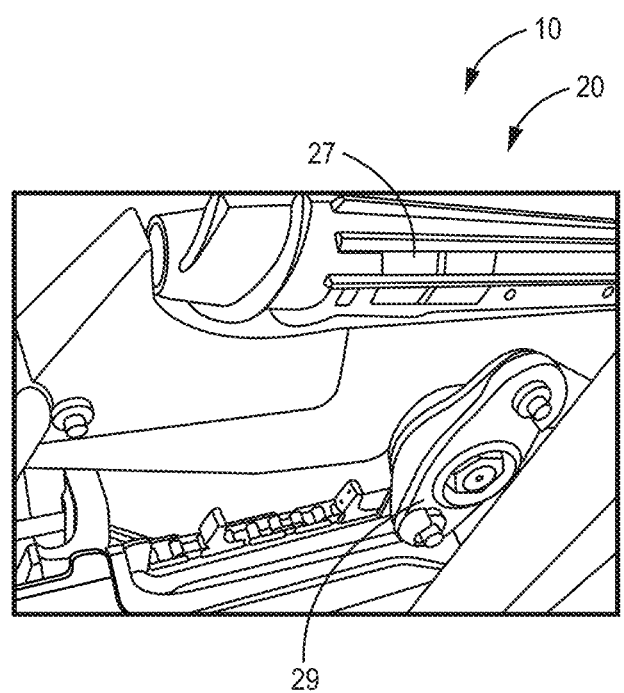
FIG. 2C is a bottom view of a corn head row unit, according to one implementation.

Turning to FIG. 2A, in certain implementations, the power supply 12 is in operative communication with the one or more controllers 16. In various implementations, the controller(s) 16 include system logic configured to operate and control the one or more motor drivers 32 and, importantly, measure and monitor power consumption by the motor 34. As will be discussed further herein, controller(s) 16 may be constructed and arranged to make logic decisions and/or correlate power consumption to agronomic data. In various implementations, the controller 16 may include an Arduino Due circuit board, or other similar circuit board/processor, configured to turn the motor 34 on and off, control direction of the row unit 20, and regulate speed of the row unit 20 or various components thereof. Various alternative hardware and software components may be constructed and arranged to perform these operations, as would be readily appreciated.

That is, in various implementations, the controller 16 further includes the various processing and computing components necessary for the operation of the system 8, including receiving, recording and processing the various received signals, generating the requisite calculations and commanding the various hardware, software and firmware components necessary to effectuate the various processes described herein. In certain implementations, the controller 16 comprises a processor 70 or CPU 70 that is in communication with a non-volatile memory 72 or other data storage component 72 and an operating system 74 or software and sufficient media to effectuate the described processes, and can be used with an operating system 74, a non-volatile memory 72/data storage 72 and the like, as would be readily appreciated by those of skill in the art. It is appreciated that in certain implementations, the data storage 72 can be local or cloud-based or some combination thereof, as would be understood.

In various implementations, the system 8 and controller 16 can comprise a circuit board, a microprocessor, a computer, or any other known type of processor or central processing unit (CPU) 70 that can be configured to assist with the operation of the system 8. In further embodiments, a plurality of CPUs 70 can be provided and may be operationally integrated with one another and various components of other systems on the vehicle 7 or used in connection with the vehicle 7 or agricultural operations, as would be appreciated. Further, it is understood that controller 16 and/or its processors 70 can be configured via programming or software to control and coordinate the recordings from and/or operation of various sensor and data logging components, as would be readily appreciated.

Further implementations of the controller 16 include a communications component 76. The communications component 76 is configured for sending and/or receiving communications to and from one or more of vehicles 7, row units 20, electric motor assemblies 30, and the like, as would be appreciated.

In further implementations, the controller(s) 16 are housed within or otherwise in operative communication with a display 14, such as the InCommand® display from Ag Leader®. In these implementations, the controller(s) 16 may operate as an interface between the system 8, a vehicle communication network, and or other systems operating on or in conjunction with the vehicle 7, such as, but not limited to, automated/assisted steering systems, as would be appreciated. In various implementations, the display 14 is located in the cab of the vehicle 7, as shown in FIG. 1A, but in alternative implementations the display 14 may also be located off-site and in communication with the controller(s) 16 via a wireless connection, as would be understood.

In further implementations, the display 14 optionally includes a graphical user interface ("GUI") 78 and optionally a graphics processing unit ("GPU") 80. In these and other implementations, the GUI 78 and/or GPU 80 allows for the display of information to a user and optionally for a user to interact with the displayed information, as would be readily appreciated. It would be understood that various input methods are possible for user interaction including but not limited to a touch screen, various buttons, a keyboard, or the like.

Figure 3A:
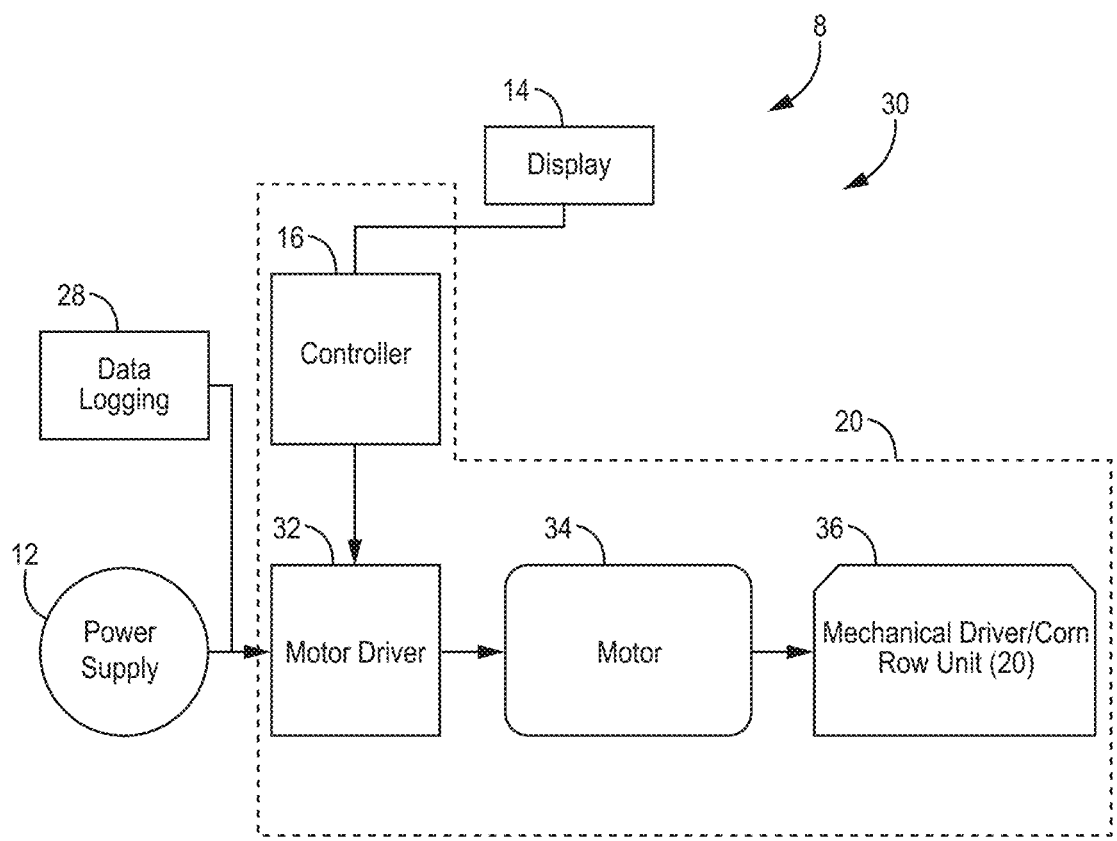
FIG. 3A is a schematic diagram of the system, according to one implementation.

Turning to FIGS. 2A and 3A, in various implementations, the motor driver 32 is in electric or otherwise operational communication with the power supply 12. The motor driver 32 is constructed and arranged to receive voltage/input from the power supply 12 and the controller(s) 16 to drive the electric motor(s) 34. In one specific example, the motor driver 32 is a commercially available brushless direct current ("BLDC") motor driver 32, such as from Anaheim Automation, or more specifically a 1 hp BLDC motor driver from ATO. Various alternative motor drivers 32 are possible and would be recognized by those of skill in the art. In certain implementations, the motor driver 32 is rated for up to 50V and up to 30 Amps, other ratings are of course possible. In various implementations, the motor driver 32 is configured to convert an incoming power supply 12 to three-phase power to supply to the motor 34.

In various implementations, a motor 34, such as an electric motor 34, is operatively engaged with the motor driver 32. Each electric motor 34 may be configured to provide independent control of the components of each row unit 20 or a set of row units 20. Further, the individual motors 34 are constructed and arranged to provide feedback regarding power consumption that is received by the controller 16. The electric motor 34 of these implementations further provides the power to the gear box 36 and/or mechanical drive system 36 of the row unit 20. In one specific example, the motor 34 is a 1 horsepower BLDC motor 34, various other motor 34 sizes and types are of course possible and would be appreciated by those of skill in the art.

In various implementations, the mechanical drive system 36 receives input power from the drive shaft of the motor 34 to provide power to the stalk rolls 27 and gathering chains 24 that feed the crop into the row unit 20 and strip ears from the stalks as the ears hit the stripper plates 22, as would be understood. In certain implementations, the mechanical drive system 36 may include a chain sprocket system to transmit power, as well as other header components optionally understood to be useful in the harvester header and understood by those of skill in the art. In certain other implementations, the row unit 20 may include one or more chopping blades (shown for example in FIG. 2C at 29) driven by the same mechanical drive system 36. In these implementations, the chopping blades 29 may be configured to cut down remaining stalk residue during harvest, as would be appreciated.

Continuing with FIG. 3A, in various implementations, the system 8 includes a data logger 28 or module 28 comprising memory or storage capabilities, such as digital media storage.

The data logger 28 may be disposed between or otherwise in communication with the motor driver 32 and the power supply 12. Various alternative locations are of course possible and would be understood by those of skill in the art. In these implementations, the data logger 28 may be a DEWE-43 data acquisition system, or any other data acquisition system, as would be appreciated. In various implementations, the data logger 28 may be configured to log the voltage and current between the power supply 12 and the motor driver 32 over time. In various implementations, the data logger 28 is in operative communication with the controller 16 and/or display 14.

As noted above, in various implementations the system 8 and corn head 10 enable independent control over each row unit 20 such that the power to each corn head row unit 20 is dependent on harvest and crop conditions of each particular row. In certain implementations, the system 8 can dynamically change the speed of the row unit 20 by monitoring motor current feedback to prevent header loss, kernel damage or loss, snapping, breakage and the like, as well as unnecessary energy loss. In these implementations, by monitoring the current feedback, the system 8 is able to compare it with one or more defined thresholds and alter row unit speed as necessary. Automated speed changes relative to the crop can increase harvesting efficiency and allow the row unit 20 to more accurately maintain throughput.

Figure 3B:
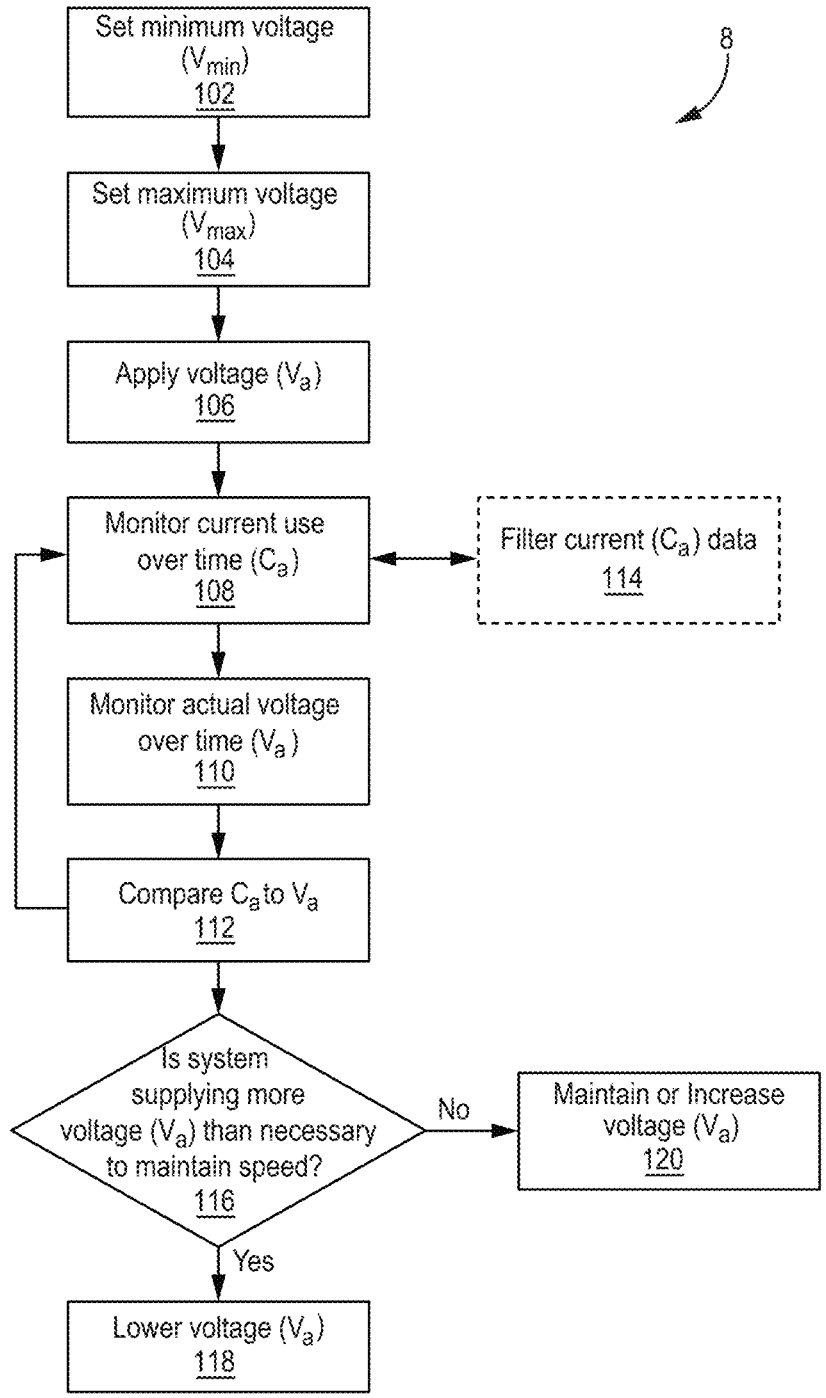
FIG. 3B is a flow diagram of the system, according to one implementation.

Various implementations of the system 8 utilizes dynamic control to maximize efficiency and address these issues. Turning to FIG. 3B, in certain implementations, the system 8 is configured to execute a series of steps for dynamic control, each of which is optional and may be performed in any order or not at all.

In a first optional step according to these implementations, the system 8 sets a minimum voltage ($V_{min}$) (box 102) for the supply of voltage to each motor 24/row unit 20. In a further optional step, the system 8 sets a maximum voltage ($V_{max}$) (box 104) for voltage to each motor 24/row unit 20. In various implementations, the $V_{min}$ and $V_{max}$ are pre-programmed into the system 8. In alternative implementations the $V_{min}$ and $V_{max}$ are set by an operator or other stakeholder. In still further implementations, the $V_{min}$ and $V_{max}$ are adjusted over time via one or more machine learning models, as would be understood.

In a further optional step, the system 8 provides or otherwise applies a specified voltage ($V_a$) (box 106) to the motor 34 and/or row unit 20, as described further above. The system 8 according to these implementations is configured such that the applied voltage ($V_a$) is between $V_{min}$ and $V_{max}$ and set to turn the motor 34 and thereby the various components of a row unit 20 at a desired speed. As would be understood, the voltage applied ($V_a$) to the motor/row unit will cause it and/or the various connected components to rotate or otherwise move at a given speed or rate. The amount of effort or torque necessary to maintain a row unit 20 speed may vary at different points in harvest operations, particularly as the row unit 20 accepts a stalk and pulls the ear from the stalk, as would be appreciated. That is as the row unit 20 harvests a stalk the amount of torque/effort will increase.

In a further optional step, the system 8, according to such implementations, is configured to monitor current usage ($C_a$) over time (box 108) and actual voltage applied ($V_a$) over time (box 110). In a further optional step, the current usage ($C_a$) is compared to the voltage applied ($V_a$) for analysis of the efficiency and operations of each row unit 20 (box 112). In certain of these implementations, the system 8 is configured to filter the current usage ($C_a$) data (box 114) to reduce or eliminate noise. In various implementations, the system 8 uses a Kalman filter or other filtering technique appreciated by those of skill in the art.

In certain implementations, in another optional step, the system 8 analyzes the currant usage ($C_a$) and applied voltage ($V_a$) to determine if more voltage than necessary to being applied to the motor 34 and row unit 20 to maintain the row unit 20 speed (box 116). That is, the system 8 analyzes and compares current ($C_a$) and voltage ($V_a$) data to determine if less voltage can be applied while maintaining the same row unit 20 speed. As would be appreciated, by supplying less voltage the system 8 can reduce wear and tear while also saving energy, increasing the overall efficiency of the header 10, and reducing crop damage, as well as providing the other advantages of dynamic control discussed above.

In a further optional step, the system 8 dynamically adjusts the voltage ($V_a$) such that only the necessary amount of voltage is being supplied to the row unit 20, while maintaining the required torque/effort necessary to conduct harvest operations. In one such step, if the system 8 determines that too must voltage is being applied to maintain speed the system 8 may lower the voltage (box 118). Alternatively, if the system 8 determines that not enough voltage is being applied or if the correct amount of voltage is being applied then the system 8 may either maintain or increase the applied voltage (box 120), as would be understood in light of this disclosure. That is, in use according to these implementations, the system 8 applies a specified voltage to each motor 34 and/or row unit 20 between specified maximum and minimum voltages depending on the observed current usage so as to exercise dynamic control over the row unit 20 and/or various components thereof. Further configurations of executable steps and optional features are of course possible.

Additionally, the individual control of each row unit 20 enables the row units 20 to operate at different speeds. This is an improvement from present technology, where existing corn heads 10 must run all row units 20 at the same speed. In certain implementations, the speed of each row unit 20 can compensate for changing turn and ground speeds or other crop or harvest conditions, as would be readily appreciated. In various implementations, the system 8 may interface with guidance, mapping and/or automated steering systems, such as those described in U.S. Pat. No. 10,684,305, U.S. patent application Ser. No. 16/918,300, U.S. patent application Ser. No. 16/921,828, U.S. patent application Ser. No. 16/939,785, U.S. patent application Ser. No. 17/132,152, U.S. patent application Ser. No. 17/323,649, U.S. patent application Ser. No. 17/369,876, and U.S. patent application Ser. No. 17/381,900 and other of the incorporated references. Additionally, individual speed control for each row unit 20 can improve the feed rate, prevent plugging, and optimize stalk roll 27 speed to minimize crop loss. Someone having ordinary skill in the art would recognize additional advantages of automated and individualized control of each row unit 20.

Figure 4:
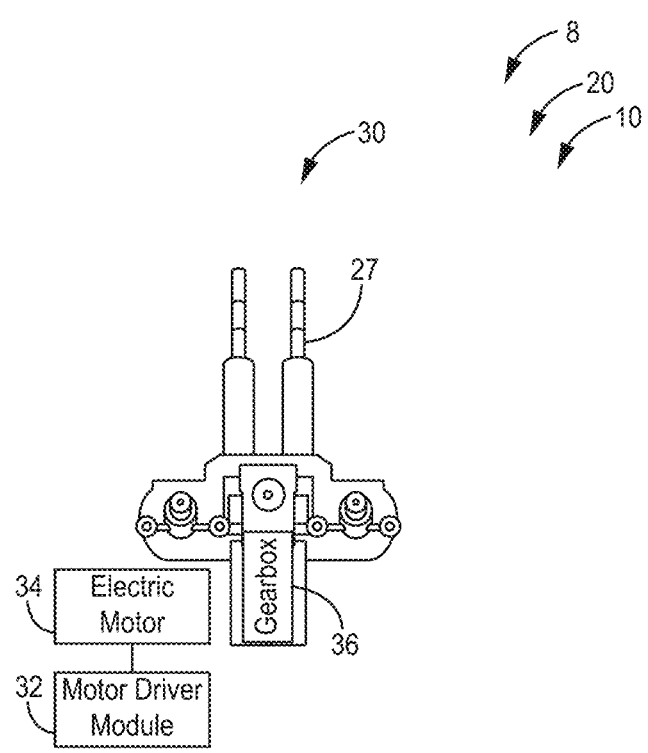
FIG. 4 is a perspective view of the electric drive motor assembly, according to one implementation.
Figure 5:
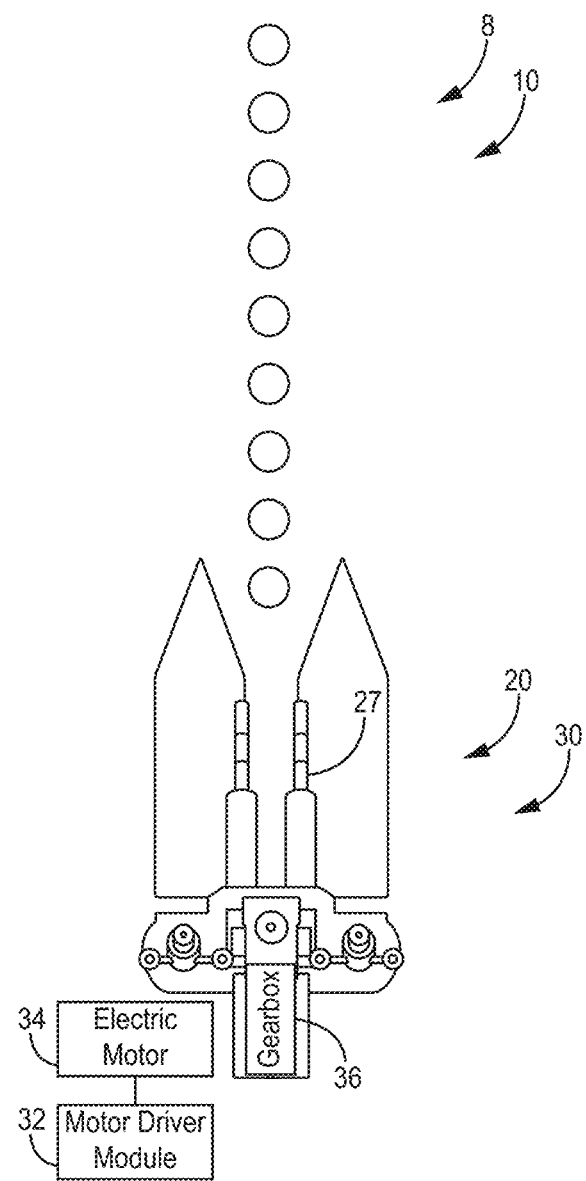
FIG. 5 is a top view of an electric drive motor assembly as part of a row unit, according to one implementation.

Turning to FIGS. 4 and 5, in various implementations, the system 8 is retrofitted on an existing corn head 10. In these implementations, the electric motor assembly 30 is configured to be retrofitted to each of the row units 20 of an existing corn head 10. This retrofitted electric motor assembly 30, according to certain implementations, includes a motor driver 32, an electric motor 34, and optionally, a mechanical drive system 36, as described above. In these implementations, the motor driver 32, motor 34, and mechanical drive system 36 have substantially the same function as described above. In various implementations, the retrofitted electric motor assembly 30 may be fitted to be engaged with the existing gearbox/mechanical drive system 36. In certain alternative implementations, the gearbox/mechanical drive system 36 may be replaced with a more appropriately sized system, as would be appreciated. That is, in various implementations, certain components of the corn head 10 and row units 20 may be eliminated, such as a slip clutch, gears, and other components as would be understood. Yet, in alternative implementations, various components may remain as part of the row unit 20 although unnecessary for operation of the system 8.

By retrofitting an existing corn head 10 with the system 8, and specifically electric motor assemblies 30, an existing corn head 10 can be configured for row-by-row control, as described herein.

Figure 6:
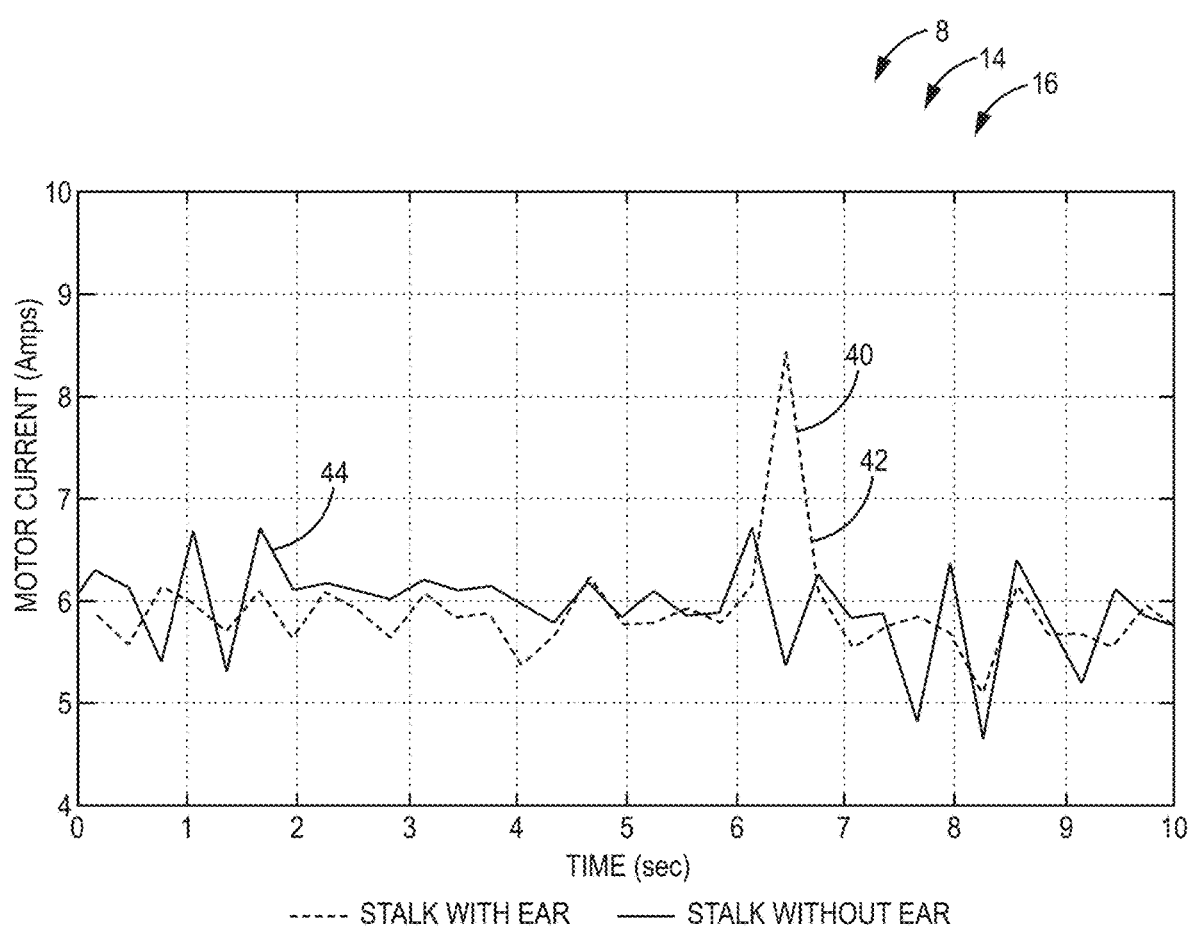
FIG. 6 is an exemplary graph showing motor current data over time, according to one implementation.

FIG. 6 shows an exemplary graph of motor current data over time. In various implementations, as a stalk is fed through the row unit 20 there is a spike 40 in the motor current, as would be understood. That is, additional torque/effort is required to harvest a stalk and as such the row unit draws addition power when harvesting a stalk, as would be readily appreciated in light of this disclosure. As can be seen from FIG. 6 slight fluctuations of motor current over time are expected, while a large spike 40 can be seen when a stalk and/or ear are stripped/pass through the row unit 20. The motor current shown at 42 in FIG. 6 shows the motor current over time for a row unit 20 that has harvested an ear. The motor current shown at 44 is the motor current over time for a row unit 20 that either has harvested a stalk that did not have an ear or did not harvest a stalk.

As can been seen in FIG. 6, when a row unit 20 harvests a stalk with an ear, there is a significant motor current spike 40, showing the increased consumption of power demanded when harvesting an ear. As noted above, the motor current is logged by a data logger 28 and/or controller 16. In various implementations, the motor current data is feedback collected by the controller 16 that is then used to regulate power to the electric motor 34 and motor driver 32, such as described above in FIG. 3B. In further implementations, the motor current data can be used to estimate stalk and/or ear size and counts and optionally overall yields, as is similarly discussed in U.S. Pat. No. 11,064,653, U.S. application Ser. No. 16/800,469, U.S. application Ser. No. 17/013,037, and U.S. application Ser. No. 17/226,002 which are incorporated by reference herein.

In certain implementations, the size of the motor current spike 40 may be correlated to the size of the stalk and/or ear. That is, a larger spike 40, greater current draw, may be indicative of a larger stalk and thereby a larger ear. A small spike may be indicative of a thin or non-productive stalk. By estimating the size of the stalk or ear from the motor current spike 40, individual stalk yield can be estimated. In various implementations, the motor current data may be used to generate additional agronomic data, such as as-harvested versus as-planted populations, presence of weeds and/or foreign materials, planting quality, such as spacing, and the like as would be understood.

Figure 7:
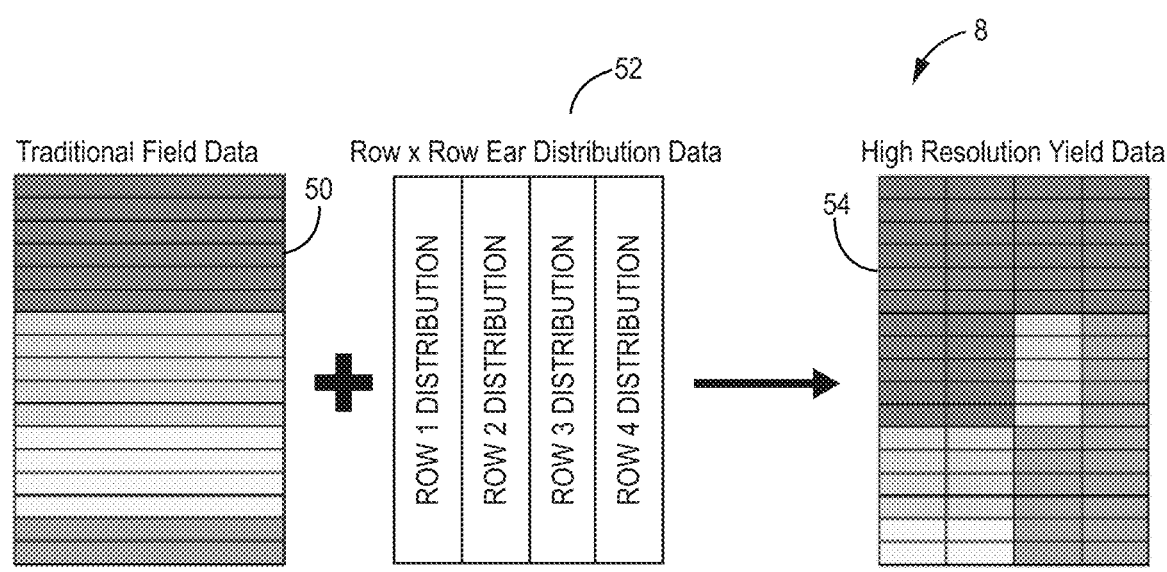
FIG. 7 shows traditional and high resolution yield data as generated by the system, according to one implementation.

Turning to FIG. 7, as noted above, motor current data can be used to more accurately predict overall yield during harvest. In various implementations, the motor current data may be used in conjunction with stalk sensor data, as has been previously described in the incorporated references. Traditional yield data 50 is often measured using mass flow sensors located on or associated with the combine 7, but these types of yield sensors often do not accurately map overall yield. That is, these known yield sensors measure yield across the entire swath of the corn head, and the data is delayed due to the inherent distance the crop must travel from the row unit 20 to the yield sensor.

In various implementations, the system 8 may be constructed and arranged to map yield data on a row-by-row basis, and in certain implementations on a plant-by-plant basis, thereby improving overall yield data, as is described in U.S. Patent Application 63/241,393 which is incorporated herein by reference. As discussed above, motor current data gathered by the system 8 can indicate when an ear is harvested on a row-by-row, and in some implementations plant-by-plant, basis. That is, because with the system 8 each row has its own motor driver 32 and motor 34, motor current data can be gathered for each row unit 20. This row-by-row distribution data 52 may be used to quantify the distribution of ears/yield across each row, as shown in FIG. 7. In various implementations, the traditional yield data 50 gathered by mass flow or other sensors can be combined with the row-by-row distribution data 52 to generate high-resolution yield data 54. This high-resolution yield data 54 is more granular and therefore more precise than the traditional yield data 50, for example by showing yields on a row-by-row basis.

Figure 8:
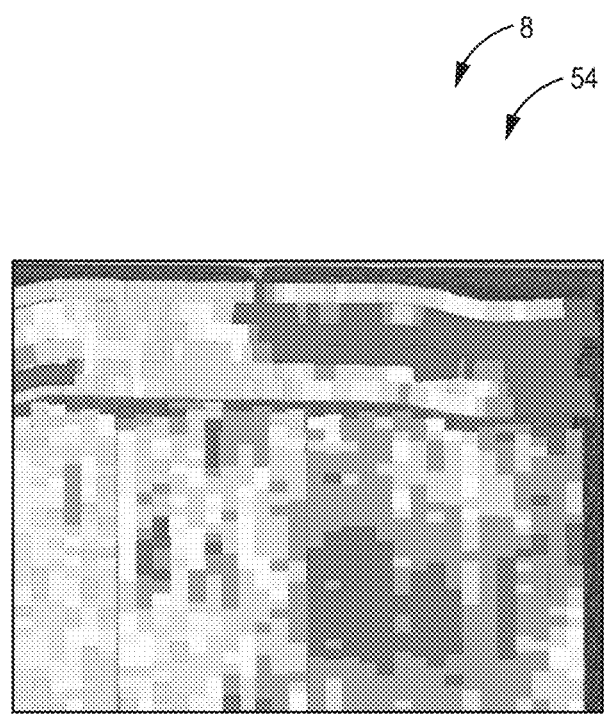
FIG. 8 shows an exemplary map of overall yield data, according to one implementation.

FIG. 8 shows an exemplary map of overall yield data from traditional yield sensors. As would be understood, these traditional methods of yield mapping have various inaccuracies including gaps and staggered edges due to mapping delays. That is, various prior known systems use a header height sensor and an artificial time delay to map yield data. By incorporating the row-by-row or plant-by-plant distribution data, the system 8 can more accurately place yield data on a map. For example, the time delay can be accurately calculated by correlating the motor current spikes 40 with the mass flow sensor data. In various implementations, the system 8 can calculate the time difference between when a motor current spike 40 occurs and when a mass flow sensor first detects the presence of crop. In certain implementations, the system 8 thereby eliminates the need for calibration by an operator. Various other advantages of high-resolution yield data 54 are possible and would be recognized by those of skill in the art.

Figure 9:
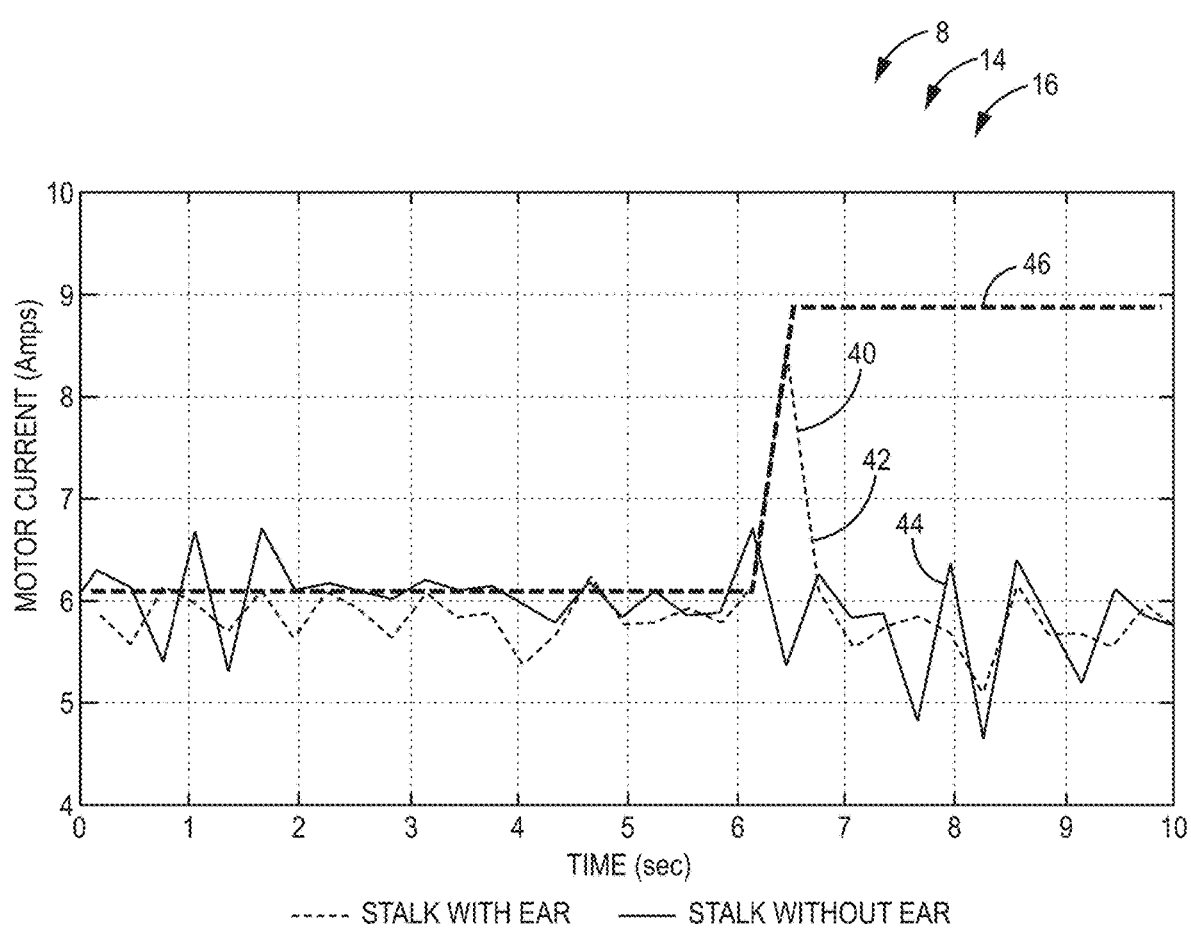
FIG. 9 is an exemplary graph showing motor current data over time when a row unit is plugged, according to one implementation.

Turning to FIG. 9, motor current data, including spikes 40, may also provide feedback to the controller 16 that can generate significant operational advantages. For example, if the motor current differs from normal or anticipated harvest conditions, this feedback may indicate that a row unit 20 is plugged. Such an abnormal spike may include an absent, long, sustained, and/or excessively large spike, shown for example at 46. As is appreciated, plugged rows can be difficult to detect with existing corn heads 10 and row units 20 because the detection process is not automated and usually left to the operators to detect visually. Because visual detection of plugged row unit 20 is difficult due to the size of the corn head 10 and row units 20, feedback indicating a plugged corn row unit 20 would enable an operator to promptly resolve the plug, thereby minimizing crop loss and potential damage to the corn head 10.

In certain implementations, the controller 16 is programmed to detect plugged row units 20 using motor current data and automatically reverse and restart the plugged corn row unit 20 to resolve the plug automatically. In existing corn heads 10 and row units 20 the operator is required to reverse the entire head 10 to resolve a plug on a single row unit 20. Because the electrically driven corn head 10 individually controls each corn head row unit 20, only the plugged row unit 20 need be reversed to resolve the plug which limits crop loss. Someone having ordinary skill in the art would recognize that other operational advantages related to the motor current and spike 40 feedback are possible.

In various alternative implementations, when a plugged row unit 20 is detected the system 8 may emit an alarm, such as an audible and/or visual alarm, notifying an operator of the plugged row unit 20 such that the operator can take corrective action.

Although the disclosure has been described with reference to preferred embodiments, persons skilled in the art will recognize that changes may be made in form and detail without departing from the spirit and scope of the disclosed apparatus, systems and methods.

What is claimed is:

1. A corn harvesting system comprising:
   a) a power supply;
   b) a plurality of row units, each row unit comprising:
      i) a motor driver in electrical communication with the power supply; and
      ii) a motor in operative communication with the motor driver; and
   c) a controller in electrical communication with the power supply and the motor driver,
   wherein the controller records motor electrical current data during harvesting operations and wherein the system is configured to determine stalk sizes from the motor electrical current data.

2. The system of claim 1, wherein the motor electrical current data is analyzed to detect and measure harvested crops.

3. The system of claim 2, further comprising a display in communication with the controller and a yield monitor in communication with the display, wherein the display is configured to map yields row-by-row.

4. The system of claim 1, wherein the controller is constructed and arranged to individually control each of the plurality of row units.

5. The system of claim 4, wherein the controller is configured to dynamically adjust power to each of the plurality of row units.

6. The system of claim 1, wherein the controller is configured to detect a plugged row unit from the motor current data.

7. The system of claim 6, wherein the controller is configured to reverse the plugged row unit when the plugged row unit is detected.

8. A corn harvesting system, comprising:
   (a) one or more row units, each row unit comprising:
      (i) a motor driver and
      (ii) a motor in communication with the motor driver,
      wherein the motor drives a mechanical drive system of the row unit;
   (b) a power source in communication with each row unit;
   (c) at least one controller in communication with the power source and the motor driver; and
   (d) a data logger configured to measure and log electrical current flow between the power source and the motor driver,
   wherein each row unit is individually controllable and wherein current flow data is used to count stalks passing through each of the row units.

9. The system of claim 8, wherein the system is configured to combine current flow data with yield monitor data to generate row-by-row yield data.

10. The system of claim 9, wherein the row-by-row yield data further comprises plant-by-plant yield data.

11. The system of claim 8, further comprising a controller in association with each row unit.

12. The system of claim 8, wherein the system is configured to dynamically adjust power to each of the one or more row units.

13. A corn head retrofit assembly, comprising:
   (a) an electric motor assembly, comprising:
      (i) a motor driver and
      (ii) an electric motor in communication with the motor driver;
   (b) a controller in operative communication with the electric motor assembly; and
   (c) a data logger configured to log electric current data over time between the motor driver and the electric motor,
   wherein the electric motor assembly drives a mechanical drive system of a row unit, wherein the controller allows for independent control of the mechanical drive system via the electric motor assembly, and wherein the data logger is in operative communication with a display configured to detect spikes in the current indicative of stalks passing through the row unit.

14. The corn head retrofit assembly of claim 13, wherein the mechanical drive system includes stalk rolls and gathering chains.

15. The corn head retrofit assembly of claim 13, wherein the motor driver is in operative communication with a power supply.

16. The corn head retrofit assembly of claim 13, wherein the display is configured to estimate yields row-by-row from the current.

\* \* \* \* \*